US006860425B2

(12) United States Patent
Briley et al.

(10) Patent No.: US 6,860,425 B2
(45) Date of Patent: Mar. 1, 2005

(54) POSTAGE METER INDICIA VERIFICATION APPARATUS AND METHOD

(75) Inventors: Daniel L. Briley, Escondido, CA (US); Donald B. Ouchida, Corvallis, OR (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/336,460

(22) Filed: Jan. 3, 2003

(65) Prior Publication Data

US 2004/0129782 A1 Jul. 8, 2004

(51) Int. Cl.$^{7}$ .................................................. G06K 7/10
(52) U.S. Cl. ........................................ 235/454; 235/470
(58) Field of Search ................................ 235/454, 375, 235/376, 381, 470; 209/584, 900

(56) References Cited

U.S. PATENT DOCUMENTS

| | | | | | |
|---|---|---|---|---|---|
| 4,699,531 | A | | 10/1987 | Ulinski, Sr. et al. | |
| 4,795,281 | A | | 1/1989 | Ulinski, Sr. et al. | |
| 4,829,568 | A | | 5/1989 | Clark et al. | |
| 4,907,013 | A | | 3/1990 | Hubbard et al. | |
| 5,239,168 | A | | 8/1993 | Durst, Jr. et al. | |
| 5,326,181 | A | | 7/1994 | Eisner et al. | |
| 5,369,258 | A | * | 11/1994 | Sansone et al. | 235/381 |
| 6,039,257 | A | * | 3/2000 | Berson et al. | 235/468 |
| 6,311,892 | B1 | * | 11/2001 | O'Callaghan et al. | 235/375 |
| 6,499,020 | B1 | * | 12/2002 | Dolan et al. | 705/406 |
| 6,517,265 | B2 | * | 2/2003 | Evans et al. | 400/74 |

FOREIGN PATENT DOCUMENTS

| | | |
|---|---|---|
| EP | 1143385 | 10/2001 |
| GB | 2097330 | 11/1992 |

OTHER PUBLICATIONS

Apr. 29, 2004 Search Report for GB Application No: GB 0329222.4.

* cited by examiner

*Primary Examiner*—Daniel Stcyr

(57) ABSTRACT

A postage meter indicia verification apparatus and method includes, in a postage meter system for printing postage indicia, a postage meter device with a print head for printing postage indicia on media. A sensor is connected to the postage meter device for determining the presence of postage indicia printed on the media by the print head. A control device is connected to the postage meter device for controlling the operation of the postage meter device in accordance with the results of the sensor determination.

24 Claims, 1 Drawing Sheet

POSTAGE METER INDICIA VERIFICATION APPARATUS AND METHOD

FIELD OF THE INVENTION

This invention relates to a postage meter indicia verification apparatus and method. In particular, the invention relates to a postage meter indicia verification apparatus and method in a postage meter system for printing postage indicia including a postage meter device with a print head for printing postage indicia on media. A sensor is connected to the postage meter device for determining the presence of postage indicia printed on the media by the print head and a control device is connected to the postage meter device for controlling the operation of the postage meter device in accordance with the results of the sensor determination.

BACKGROUND OF THE INVENTION

The United States Postal System ("USPS"), despite its faults, is the envy of the civilized world. Technology is making this good system even better. One-way technology has advanced the services offered by the USPS is by providing postage meter systems that can be operated in businesses and homes and do not need to be connected to the USPS local office to operate. That is, these postage meter systems enable a user to run media past a postage meter device with a print head so as to deposit postage indicia on an item to be mailed. This eliminates the need for using stamps and/or for taking the media to the Post Office for "metering."

Nonetheless, these advances have brought new, time-consuming, difficulties into the office place. One of the major difficulties associated with these meter systems known in the art is accounting for postage charged for use of the system when, in fact, no postage indicia was printed. This is not an infrequent occurrence in offices utilizing these postage meter systems. In fact, this happens quite often for a variety of reasons among which are that the system is out of postage, out of ink, a paper jam has occurred or the print head itself has malfunctioned. In any event, for whatever reason, today when an item to be mailed has been passed through a postage meter system print head and no postage indicia in fact was printed, a user faces a time-consuming and tedious task to be reimbursed for postage charged for, but not received. Essentially, the task requires the user to create documentary evidence that the postage meter system has malfunctioned and the user was charged for postage not received and to present this evidence to the USPS for reimbursement.

SUMMARY OF THE INVENTION

Accordingly, the postage meter indicia verification apparatus and method according to an embodiment of the present invention includes, in a postage meter system for printing postage indicia, a postage meter device with a print head for printing postage indicia on media. A sensor is connected to the postage meter device for determining the presence of postage indicia printed on the media. A control device is connected to the postage meter device for controlling the operation of the postage meter device in accordance with the results of the sensor determination.

In one aspect of the invention, the control device is conformed to enable the postage meter system to allot for postage indicia printed by the print head after the sensor determines the presence of postage indicia on the media. In another aspect of the invention, the control device is conformed to stop the postage meter device when the sensor determines that no postage indicia was printed on the media by the print head. In a further aspect of the invention, the control device is conformed to enable the postage meter system to allot for postage indicia printed by the print head after the sensor determines the presence of postage indicia on the media and to stop the postage meter device after the sensor determines the absence of postage indicia on the media.

In another aspect of the invention, the control device is conformed to stop the postage meter device and to send a help signal to the user through the postage meter system after the sensor determines that no postage indicia was printed on the media. In one aspect of the invention, the help signal is selected from a group including: out of postage, out of ink, paper jam and print head malfunction. In another aspect of the invention, the sensor is an optical sensor. In a further aspect of the invention, a postage meter bank account is connected to the postage meter system with funds for paying for printed postage indicia. In other aspects of the invention, the media is an envelope to be mailed or a self-adhesive strip to be attached to an item to be mailed.

DETAILED DESCRIPTION OF THE INVENTION

Figure 1:
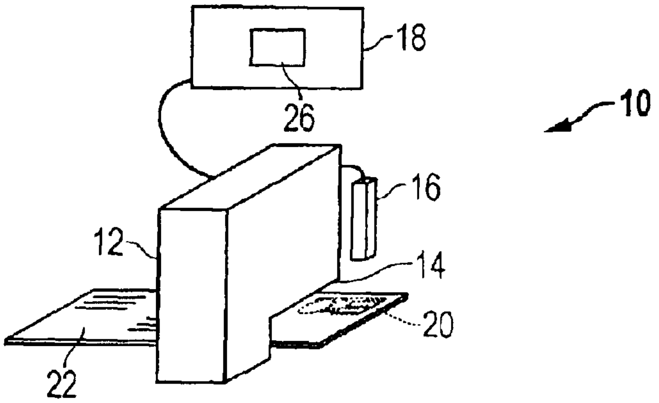
FIG. 1 is an illustration of the postage meter indicia verification apparatus according to an embodiment of the present invention.
Figure 2:
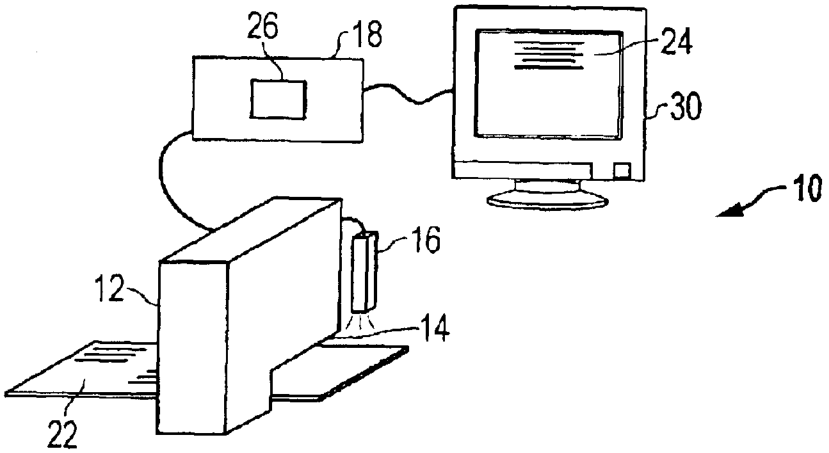
FIG. 2 is an illustration of the invention of FIG. 1 showing a help screen and a no indicia printed situation.
Figure 3:
FIG. 3 is an illustration of a self-adhesive media for use with the invention of FIG. 1.

The preferred embodiment of the present invention is illustrated by way of example in FIGS. 1-3. With specific reference to FIG. 1, the postage meter indicia verification apparatus 10 according to one embodiment of the present invention includes postage meter device 12 with a print head 14. A sensor 16 is connected to the postage meter device 12 and a control device 18 is connected to the postage meter device 12.

Together, postage meter device 12, print head 14, sensor 16, and control device 18 form a postage meter system for printing postage indicia 20 on media 22. Control device 18 controls the operation of postage meter device 12 in accordance with the results of the sensor 16 determination. That is, sensor 16 determines the presence of postage indicia 20 printed on media 22 by print head 14. Once sensor 16 determines the presence of postage indicia 20 on media 22, a signal is sent to the postage meter device 12 and from the postage meter device 12 to control device 18 enabling the postage meter device 12 to continue to print. If no postage indicia 20 is determined to be present by sensor 16, the control device 18 disables postage meter device 12 so that it can no longer attempt to print postage indicia 20.

In another aspect of the invention, control device 18 is conformed to enable the postage meter system to allot for postage indicia 20 printed by the print head 14 after the sensor 16 determines the presence of the postage indicia 20 on the media 22. Again, it is common in the prior art for postage meter systems to have an ability to keep track of the amount of postage printed by postage meter device 12. On the other hand, in the case where the sensor 16 determines that no postage indicia 20 was printed on media 22 by the print head 14, control device 18 may be conformed to stop the postage meter device 12, as previously discussed, and also to send a help signal 24 to the user through the postage meter system as will be discussed more fully hereafter with regard to FIG. 2.

In a preferred embodiment, postage meter verification apparatus 10 includes a postage meter bank account 26 connected to control device 18. In this embodiment, postage meter bank account 26 includes funds for paying for printed postage indicia 20. That is to say, postage meter bank account 26 is any hardware or software device now known or hereafter developed for storing funds to pay for postage indicia 20 printed on media 22 by print head 14. When such a postage meter bank account 26 is provided, the determination of sensor 16 by means of control device 18 determines whether or not funds are deducted from postage meter bank account 26.

According to other aspects of the invention, media 22 is any envelope, mailer, or the like upon which postage indicia 20 is applied directly. Media 22 may also be separate and apart from the object to be mailed. That is, as illustrated in FIG. 3, media 22 may be a self-adhesive strip 28 to be attached to an item to be mailed. If so, self-adhesive strip 28 is run past print head 14 and postage indicia 20 is printed directly on self-adhesive strip 28. Postage meter verification apparatus 10 functions in the same way, as discussed above, no matter what the media 22 is.

Referring now to FIG. 2, other aspects of the postage meter verification apparatus 10 are discussed. According to one aspect of the invention, as previously mentioned, help signal 24 is sent to a user by means of control device 18 upon control device 18 receiving information from sensor 16 that no postage indicia 20 was printed on media 22. Help signal 24 may be displayed on computer monitor 30 or any such device now known or hereafter developed. Help signal 24 may be any desired signal useful to a user including, but not limited to, messages to the user that the postage meter system is out of postage, out of ink, a paper jam has occurred, or that there has been a print head malfunction. In these instances, obviously, control device 18 has received additional information from postage meter device 12, postage meter bank account 26, and/or print head 14 as well as the sensor 16 determination as to whether or not postage indicia 20 has been applied to media 22. This additional information may be provided by the use of a plurality of sensors 16 each monitoring separate aspects of the system and sending determinations to control device 18. Control device 18 may be any control device now known, such as a computer system, or hereafter developed. According to one aspect of the invention, program code is provided with instructions for operating and overseeing the postage meter indicia verification apparatus and method 10.

FIG. 2 illustrates the situation where media 22 has passed by, through, or underneath, postage meter device 12/print head 14 and no postage indicia 20 has been deposited on media 22. According to one aspect of the invention, the postage meter system 10 is temporarily shut down when the sensor 16 detects a "problem" with the indicia 20 so as to avoid/prevent additional problems. In one aspect of the invention, sensor 16 is an optical sensor consisting of a light source with a wavelength of illumination that the indicia 20 ink color is sensitive to and an optical detector that senses the wavelength of light that is emitted by the indicia. Such an optical sensor assembly is capable of determining the presence or absence of postage indicia 20. Certainly, any sensor 16 now known or hereafter developed capable of determining the absence or presence of postage indicia 20 on media 22 is appropriate for the purposes of this invention.

The description of the present embodiments of the invention have been presented for purposes of illustration, but are not intended to be exhaustive or to limit the invention to the forms disclosed. Many modifications and variations will be apparent to those of ordinary skill in the art. As such, while the present invention has been disclosed in connection with the preferred embodiments thereof, it should be understood that there may be other embodiments which fall within the spirit and scope of the invention as defined by the following claims.

What is claimed is:

1. In a postage meter system for printing postage indicia, a postage meter indicia verification apparatus, the apparatus comprising:

a) a postage meter device with a print head for printing postage indicia on media;

b) a single sensor connected to said postage meter device for determining the presence of postage indicia printed on said media by said print head; and c) a control means connected to said postage meter device for controlling the operation of said postage meter device in accordance with the sensor determination wherein said control means is conformed to immediately disable said postage meter device such that said postage meter device is prevented from printing any indicia when said sensor determines that no postage indicia was printed on said media.

2. The apparatus of claim 1 wherein said control means is conformed to enable said postage meter system to allot for postage indicia printed by said print head after said sensor determines the presence of said postage indicia on said media.

3. The apparatus of claim 1 wherein said control means is conformed to enable said postage meter system to allot for postage indicia printed by said print head after said sensor determines the presence of postage indicia on said media and to stop said postage meter device after said sensor determines the absence of postage indicia on said media.

4. The apparatus of claim 1 wherein said control means is conformed to stop said postage meter device and send a help signal to a user through said postage meter system after said sensor determines that no postage indicia was printed on said media.

5. The apparatus of claim 4 wherein said help signal is selected from a group including: out of postage, out of ink, paper jam, and print head malfunction.

6. The apparatus of claim 1 wherein said sensor is an optical sensor.

7. The apparatus of claim 1 further comprising a postage meter bank account with funds for paying for printed postage indicia.

8. The apparatus of claim 1 wherein said media is an envelope to be mailed.

9. The apparatus of claim 1 wherein said media is a self-adhesive strip to be attached to an envelope to be mailed.

10. In a postage meter system for printing postage indicia, a postage meter indicia's verification apparatus, the apparatus comprising:

a) a postage meter device with a print head for printing postage indicia on media to be mailed;

b) a postage meter bank account device connected to the postage meter device containing funds for paying for the postage indicia when printed by the print head on the media to be mailed;

c) a single sensor connected to the postage meter device for determining the presence of postage indicia printed on the media to be mailed by the print head; and d) a control means connected to the postage meter device for controlling the operation of the postage meter device in accordance with the results of the sensor determination wherein said control means is conformed to immediately disable said postage meter device such that said postage meter device is prevented from printing any indicia when said sensor determines that no postage indicia was printed on said media.

11. The apparatus of claim 10 wherein the control means is conformed to send a payment signal to the postage meter bank account to allot funds for payment for postage indicia printed by the print head after the sensor determines the presence of postage indicia on the media to be mailed.

12. The apparatus of claim 10 wherein the control means is conformed to not send a payment signal to said postage meter bank for payment for postage indicia that was not printed on said media to be mailed as determined by said sensor.

13. The apparatus of claim 10 wherein the control means sends a payment signal to the postage meter bank once the sensor determines the presence of postage indicia on the media to be mailed and sends a no payment signal to the postage meter bank and sends a help signal to a user through the postage meter system when the sensor determines that no postage indicia was printed on the media to be mailed.

14. The apparatus of claim 13 wherein the help signal is one from a group including: out of postage, out of ink, paper jam, and print head malfunction.

15. The apparatus of claim 10 wherein the sensor is an optical sensor.

16. In a postage meter system for printing postage indicia, a postage meter indicia verification method, the method including the steps of:

a) attaching a print head to a postage meter device for printing postage indicia on media to be mailed;

b) connecting a single sensor to the postage meter device for determining the presence of postage indicia on the media to be mailed after the media to be mailed has passed the print head for printing;

c) connecting a meter bank account to the postage meter device with funds for payment of postage indicia printed by the print head;

d) connecting a control device to the postage meter device for controlling the operation of the postage meter device in accordance with the results of the sensor determination wherein said control means is conformed to disable said postage meter device such that said postage meter device is prevented from printing any indicia when said sensor determines that no postage indicia was printed on said media;

e) passing media to be mailed by the print head for printing postage indicia on the media to be mailed;

f) determining the presence of postage indicia on the media to be mailed by the sensor; and g) the control device sending a signal to the meter bank account to allot funds for payment of the printed postage.

17. The method of claim 16 further comprising the steps of:

a) determining by the sensor the absence of postage indicia on the media to be mailed;

b) sending a no indicia determination to the control device: and c) the control device sending a no payment signal to the meter bank account to not allot funds for payment.

18. The method of claim 17 further comprising the step of the control device sending a help signal to the user.

19. The method of claim 18 wherein the help signal is selected from a group including: out of postage; out of ink, paper jam, and print head malfunction.

20. In a postage meter system for printing postage indicia including a computer, a program product comprising:

(a) instructions for printing postage indicia on media with a postage meter dev (b) instructions for a single sensor for determining the presence of postage indicia printed on said media by the postage meter device; and (c) instructions for a control means connected to the postage meter device for controlling the operation of the postage meter device in accordance with the sensor determination wherein said instructions for a control means include instructions to disable said postage meter device such that said postage meter device is prevented from printing any indicia when said sensor determines that no postage indicia was printed on said media.

21. The program product of claim 20 wherein the control means further includes instructions for allotting for postage indicia after the sensor determines the presence of postage indicia on the media.

22. The program product of claim 20 further including instructions for sending a help signal to a user through the postage meter system after the sensor determines that no postage indicia was printed on the media.

23. The program product of claim 22 further including instructions for sending a help signal selected from a group including: out of postage, out of ink, paper jam and print head malfunction.

24. The program product of claim 20 further including instructions for controlling a postage meter bank account with funds for paying for printed postage indicia.

* * * * *